(12) United States Patent
Tachikawa

(10) Patent No.: US 8,760,736 B2
(45) Date of Patent: Jun. 24, 2014

(54) IMAGE READING APPARATUS, METHOD OF CONTROLLING AN IMAGE READING APPARATUS, AND STORAGE MEDIUM

(75) Inventor: Tomohiro Tachikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 12/831,977

(22) Filed: Jul. 7, 2010

(65) Prior Publication Data

US 2011/0019248 A1    Jan. 27, 2011

(30) Foreign Application Priority Data

Jul. 27, 2009   (JP) .................................. 2009-173954

(51) Int. Cl.
*H04N 1/04*   (2006.01)
*H04N 5/00*   (2011.01)
*H04N 1/407*  (2006.01)

(52) U.S. Cl.
USPC .......................... 358/498; 358/3.26; 358/3.27

(58) Field of Classification Search
USPC ............... 358/1.1, 1.9, 1.11, 1.12, 1.13, 1.14, 358/1.15, 1.16, 1.17, 1.18, 474, 483, 3.26, 358/3.27, 505, 461, 452
See application file for complete search history.

(56) References Cited

U.S. PATENT DOCUMENTS

2004/0223192 A1*  11/2004  Hiromatsu et al. ........... 358/474
2010/0309530 A1*  12/2010  Kamei .......................... 358/474

FOREIGN PATENT DOCUMENTS

| JP | 2002-176542 A | 6/2002 |
| JP | 2002-262039 A | 9/2002 |
| JP | 2004-297691 A | 10/2004 |
| JP | 2006-262285 A | 9/2006 |

* cited by examiner

*Primary Examiner* — Thierry L Pham
(74) *Attorney, Agent, or Firm* — Canon U.S.A., Inc. IP Division

(57) ABSTRACT

In an image reading apparatus, if a foreign substance that was initially present on a document plate is removed by motion of a document being conveyed, a correct read luminance value is employed, instead of a value calculated by interpolation, for a pixel at which there was initially the foreign substance but there is no longer foreign substance thereby preventing degradation due to the interpolation. If a foreign substance on the document plate is detected after the conveying of the document by the conveying unit is started, correcting by a correcting unit is performed. In a case where the foreign substance on the document plate disappears during the conveying of the document by the conveying unit and the foreign substance is no longer detected, the correcting by the correcting unit is not performed, but image data is produced according to the image of the document read by the reading unit.

6 Claims, 5 Drawing Sheets

IMAGE READING APPARATUS, METHOD OF CONTROLLING AN IMAGE READING APPARATUS, AND STORAGE MEDIUM

BACKGROUND OF THE INVENTION

1. Field of the Invention

The present invention relates to an image reading apparatus, a method of controlling an image reading apparatus, and a storage medium.

2. Description of the Related Art

In a known image reading apparatus having a document conveying unit such as an ADF (Automatic Document Feeder), an image of a document is read by an image reading unit such as a line sensor while the document is conveyed. In such an image reading apparatus, dust or foreign particles can deposit on a document plate such as a document glass plate disposed between the image reading unit and the document. If there is a foreign substance on the document plate, it becomes difficult for the image reading unit to correctly read the image of the document. A specific problem is that a resultant read image can have a streak in an area corresponding to pixels at locations where there are foreign substances such as dust, foreign particles, etc. In view of the above, Japanese Patent Laid-Open No. 2002-176542 discloses a technique to make a correction on a read image to reduce an effect of dust or foreign particles.

In an image reading apparatus disclosed in Japanese Patent Laid-Open No. 2002-176542, the location of a foreign substance is detected by reading a document plate in a state in which there is no document on the document plate. Thereafter, the image reading apparatus reads a document, and makes a correction on a resultant read image such that a luminance value of a pixel at the location at which the foreign substance was detected is corrected by interpolation using luminance values of pixels adjacent in a main scanning direction to the pixel at the location where the foreign substance was detected.

However, in the correction process disclosed in Japanese Patent Laid-Open No. 2002-176542, the correction for pixels at which the foreign substance was detected before the document is read is performed unconditionally without taking into an account the possibility that the foreign substance disappears when the document is conveyed.

That is, even in a case where the foreign substance is removed in the middle of conveying the document, for example, by friction that occurs when the document is conveyed, the correction by the interpolation on the read image is continued. In this case, the value calculated using the interpolation is employed for the luminance value of the pixel at which there was initially a foreign substance but there is no longer foreign substance, although the correct luminance value of this pixel can be read and can be used for the luminance value of the pixel of interest. The employment of the luminance value calculated by interpolation for such a pixel causes degradation in the resultant luminance value for this pixel at which there was initially foreign substance but there is no longer foreign substance.

SUMMARY OF THE INVENTION

According to an aspect of the present invention, there is provided an image reading apparatus configured to convey a document by a conveying unit, read an image of the document by a reading unit via a document plate, and produce image data based on the read image, the image reading apparatus comprising a detecting unit configured to detect a foreign substance on the document plate, a correcting unit configured to correct a luminance value for a pixel at a location where the foreign substance was detected by the detecting unit, and a control unit configured to control the correction performed by the correcting unit such that in a case where a foreign substance on the document plate is detected by the detecting unit after the conveying of the document by the conveying unit is started, the correcting unit performs the correction, while in a case where the foreign substance on the document plate disappears during the conveying of the document by the conveying unit and the foreign substance is no longer detected, the correction by the correcting unit is not performed but image data is produced according to the image of the document read by the reading unit.

Further features of the present invention will become apparent from the following description of exemplary embodiments with reference to the attached drawings.

DESCRIPTION OF THE EMBODIMENTS

The present invention is described in further detail below with reference to embodiments in conjunction with the accompanying drawings.

First Embodiment

Figure 1:
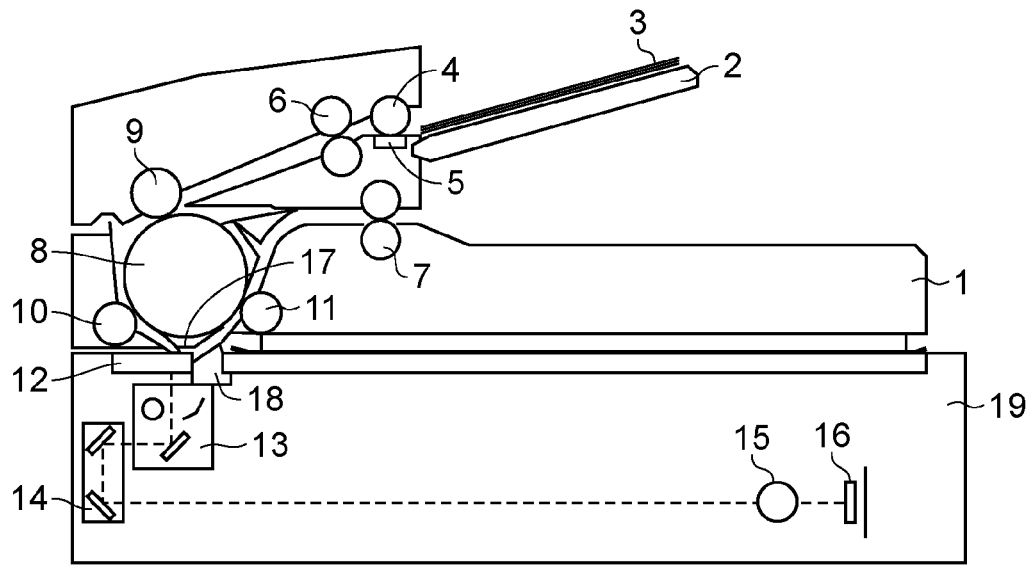
FIG. 1 is a cross-sectional view illustrating a structure of an image reading apparatus.

FIG. 1 is a cross-sectional view illustrating a structure of an image reading apparatus according to an embodiment of the present invention. The image reading apparatus according to the present embodiment of the invention includes a document feeding apparatus (ADF (Automatic Document Feeder) 1 and a document reading apparatus 19. The image reading apparatus has a moving-document read mode. In this mode, a light exposure unit 13 in the document reading apparatus 19 is maintained at rest at a particular location, and information on a document fed from the ADF 1 is read while conveying the document.

In the present example, the image reading apparatus also has a normal reading mode. In this mode, a document is put by a user at a particular location on the document glass plate, and the document is read while the light exposure unit 13 is moved at a speed depending on a magnification in a sub scanning direction. The operation of reading a document in the moving-document read mode is described in further detail below. Note that in the following description, the main scanning direction is defined as a direction perpendicular to the direction in which the document is conveyed. The main scanning direction is the same direction as a direction in which a reflected light image formed on the CCD sensor unit 16 is scanned. In the following explanation, it is assumed by way of example that the foreign substance is dust, although the foreign substance is not limited to dust, but various materials, objects, and substances can be the foreign substance. Note that the foreign substance is in a scratch-like form or other forms depending on specific cases.

A user sets a document 3 on a document tray 2. A sheet feed roller 4 operates in conjunction with a separation pad 5 to pick up one sheet of document from a stack of documents 3 and feed it toward a large roller 8. The sheet of document 3 (hereinafter referred to simply as the document 3) is further conveyed by a pair or intermediate rollers 6 into the apparatus. The document 3 fed into the apparatus is then conveyed by a combination of the large roller 8 and a first driven roller 9, and further conveyed by a combination of the large roller 8 and a second driven roller 10 such that the document 3 travels around the large roller 8 and further travels through between moving-document glass 12 and a document guide plate 17. The document then travels over a jump stage 18, and is further conveyed by a combination of the large roller 8 and a third driven roller 11.

When the document 3 is passed through between the moving-document glass 12 and the document guide plate 17, a part of the document guide plate 17 urges the document 3 into contact with the moving-document glass 12. After the document 3 is conveyed by the large roller 8 and the third driven roller 11, the document 3 is fed out by a pair of discharge rollers 7 to the outside of the apparatus.

When the document 3 is being conveyed over the moving-document glass 12, a surface of the document 3 on a side in direct contact with the moving-document glass 12 is exposed to light by the light exposure unit 13. The light exposure unit 13 receives light reflected from the document 3 and transmits the received light as document image information to a mirror unit 14. The light carrying the document image information is passed through a lens 15 such that the light is focused on the CCD sensor unit 16. The CCD sensor unit 16 converts the focused light into an electrical signal.

In the image reading apparatus according to the present embodiment of the invention, a determination is performed as to whether dust still remains on the document 3 being conveyed or dust has been removed during the conveying of the document 3, and a correction process is performed depending on whether the dust still remains. More specifically, the luminance value read by the CCD sensor unit 16 in the in-page reading process is compared with the luminance value obtained previously in the pre-page reading process, and the determination as to whether dust still remains is performed based on the comparison result.

Figure 2:
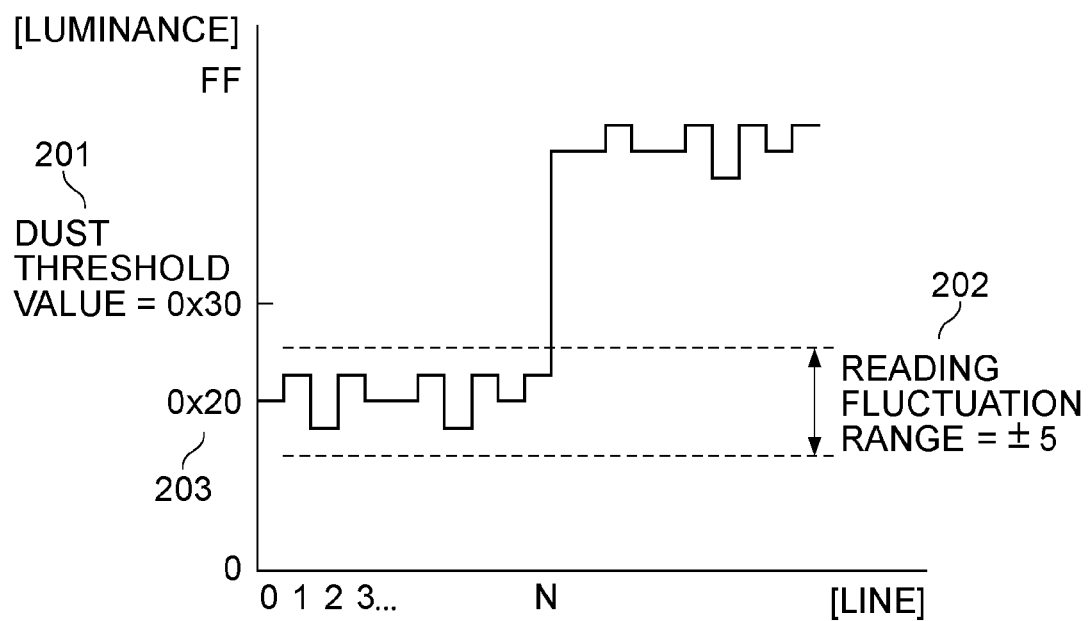
FIG. 2 is a diagram illustrating an example of a series of luminance values read by a CCD sensor unit for a particular document.

FIG. 2 illustrates a change in a signal read in the sub scanning direction by the CCD sensor unit 16 shown in FIG. 1. The luminance value of a pixel changes depending on whether the pixel is at a location corresponding to a location of dust on the document plate as explained below.

In FIG. 2, a vertical axis indicates the luminance that can take a value in the range of 0x00 to 0xFF, and a horizontal axis indicates a line position as measured in the main scanning direction. Note that in FIG. 2, the luminance value at the 0th line indicates the value obtained in the pre-page reading process. In FIG. 2, reference numeral 201 denotes a dust judgment threshold value. In the example shown in FIG. 2, the dust judgment threshold value is set to a luminance value of 0x30. Note that the dust judgment threshold value 201 is a threshold value used to determine whether there is a foreign substance. The CPU 301 shown in FIG. 3 sets the dust judgment threshold value 201 in the dust-detected location determination unit 309 via the register setting unit 313.

Reference numeral 202 denotes a reading fluctuation range. In the example shown in FIG. 2, the reading fluctuation range is set to be ±5. Reference numeral 203 denotes a luminance value obtained in the pre-page reading process performed by the image reading apparatus. In the example shown in FIG. 2, the luminance value obtained in the pre-page reading process is 0x20. In this example, the luminance value obtained in the pre-page reading process, i.e., 0x20 is lower than a predetermined value (for example, 0x30) and thus it is determined that there is dust at the corresponding locations. At a location where there is no dust, the white pressure plate is read and thus a luminance value close to 0xFF is obtained. Note that the pre-page reading process is a reading process performed in a state in which there is no document being conveyed. The white pressure plate is for pressing a document on the document glass plate when the document is present on the document glass plate. In the pre-page reading process, the white pressure plate is exposed with light and the luminance value of the white pressure plate is measured. If it is determined that the luminance value of a pixel at a location where dust was detected in the pre-page reading process (hereinafter, such a location will be referred to simply as a dust-detected location) is within the reading fluctuation range, then it is determined that dust still remains. More specifically, a process described below with reference to a flow chart is performed, and a determination is made as to whether a change in luminance value of a pixel at a dust-detected location is within the reading fluctuation range 202. If a change beyond the reading fluctuation range 202 is detected, it is determined that the dust has been automatically removed from the document glass plate by motion of the document being conveyed. If the luminance value obtained in the pre-page reading process is equal to 0x20 (initial value) for a particular pixel, the luminance value is lower than the dust judgment threshold value 201 defined as 0x30 in luminance value, and thus, in the dust processing unit 313, it is determined that this pixel is at a dust-detected location.

For the 1st to N-th lines, detected changes are within the reading fluctuation range of ±5 with respect to the initial value of 0x20 read in the pre-page reading process, and thus it is determined that the document being conveyed was read in a state in which dust still remains for the 1st to N-th lines. In this case, for these lines, the dust processing unit 313 calculates the linear-interpolation value from luminance values of pixels located adjacent to the left/right of each pixel, and the calculated value is employed as the corrected pixel value for each pixel.

In the (N+1)-th line, the measured luminance value is out of the reading fluctuation range 202, and thus the dust processing unit 313 determines that dust has been removed. In this case, the dust processing unit 313 directly employs the luminance value read by the CCD sensor unit 16 as the luminance value for this pixel without determining the corrected luminance value that would be calculated in the case where it was determined that dust still remained. For the lines following the (N+1)-th line, luminance values are out of the reading fluctuation range, and thus process is performed in a similar manner.

Figure 3:
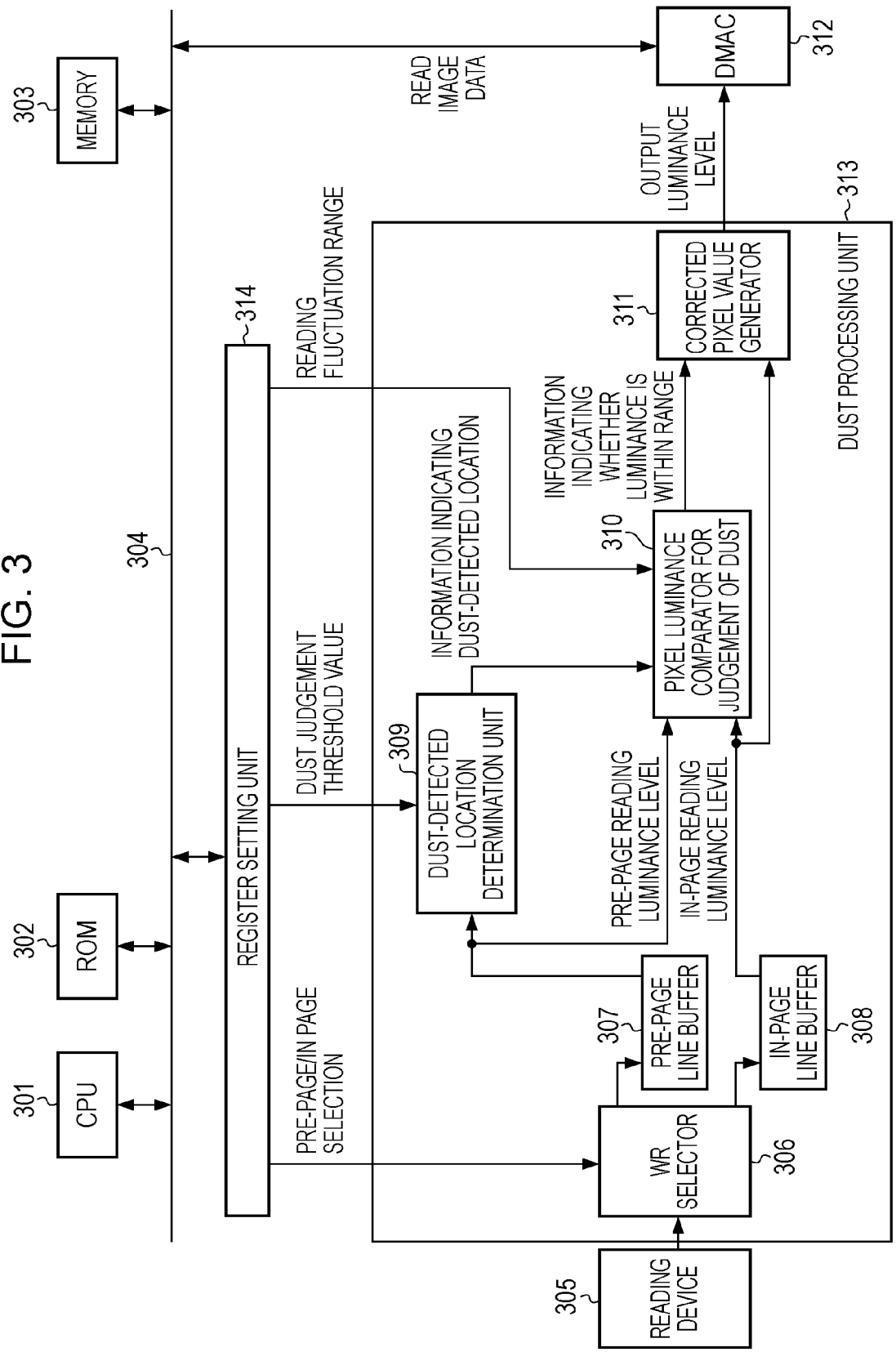
FIG. 3 is a block diagram illustrating a configuration of a reading unit in an image reading apparatus.

FIG. 3 is a block diagram illustrating a configuration of a reading unit in the image reading apparatus according to the present embodiment of the invention. In FIG. 3, reference numeral 301 denotes a central processing unit (CPU) responsible for control over the whole reading unit in accordance with a program stored in advance in a nonvolatile storage device (or ROM (Read Only Memory)) 302.

Reference numeral 303 denotes a memory for storing read image data. Reference numeral 304 denotes a processor bus (hereinafter referred to simply as the bus) that connects the CPU 301, the ROM 302, and the memory 303. Reference numeral 314 denotes a register setting unit that is connected to the bus 304 and that sets a register (not shown) in the dust processing unit 313 in terms of the reading fluctuation range 202, the dust judgment threshold value 201, etc., under the control of the CPU 301.

Reference numeral 305 denotes an image reading device corresponding to the CCD sensor unit 16 shown in FIG. 1. Reference numeral 313 denotes a dust processing unit configured to receive image data from the image reading device 305 and performs a dust-detected location determination process, a corrected pixel value calculation process, etc.

Reference numeral 312 denotes a DMAC (Direct Memory Access Controller) that receives image data output from the dust processing unit 313 and writes the image data into the memory 303.

Next, an internal configuration of the dust processing unit 313 is explained below.

A selector 306 selects a buffer to which image data (luminance values of respective pixels) output from the reading device 305 is to be written. A pre-page line buffer 307 (hereinafter referred to simply as the line buffer 307) is used as a line buffer for storing initial readings of luminance obtained in the pre-page reading process. Note that the pre-page reading process is performed in a state in which there is no document on the document glass plate.

An in-page line buffer 308 (hereinafter referred to simply as the line buffer 308) is a line buffer used in reading a page of a document being conveyed. A dust-detected location determination unit 309 determines whether a pixel value read out from the line buffer 307 is of a pixel at which dust was detected, by comparing the pixel value with the dust judgment threshold value 201.

A pixel luminance comparator 310 determines whether dust still remains based on pixel information read from the line buffer 307 and the line buffer 308. A corrected pixel value generator (correction unit) 311 generates a corrected pixel value for a pixel determined by the pixel luminance comparator 310 as being in a state in which dust still remains on the pixel such that the corrected pixel value is calculated by interpolation from pixel values of pixels adjacent to the pixel of interest.

Figure 4:
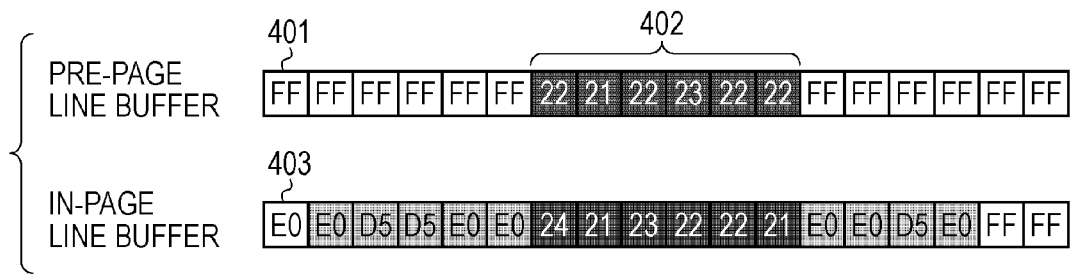
FIG. 4 is a diagram illustrating pixel data written in line buffers.

FIG. 4 illustrates an example of pixel data written in the line buffer 307 shown in FIG. 3 and an example of pixel data written in the line buffer 308 shown in FIG. 3. Note that, for simplicity of illustration, the number of pixels included in one line shown in FIG. 4 is smaller than the number of pixels actually included in one line.

In FIG. 4, reference numeral 401 illustrates pixel values obtained in the pre-page reading process and written in the line buffer 307. Note that in this example, reference numeral 402 denotes pixel values read at pixels at 7th to 12th positions where there is dust. Reference numeral 403 denotes pixel data written in the line buffer 308 in the in-page reading process.

Figure 5:
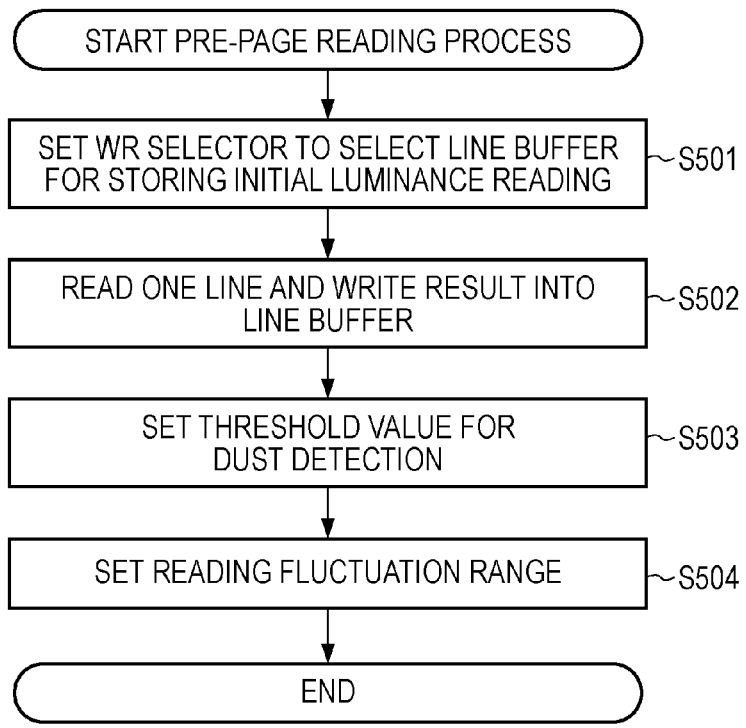
FIG. 5 is a flow chart illustrating a reading control procedure performed by an image reading apparatus.

FIG. 5 is a flow chart illustrating a reading control procedure performed by the image reading apparatus according to the present embodiment of the invention. In this example shown in FIG. 5, the pre-page reading process is performed by the dust processing unit 313 shown in FIG. 3. This process includes steps S501 to S504 and is performed by the CPU 301 by loading a control program from the ROM 302 into the memory 303 and executing it. The process shown in the flow chart of FIG. 5 is started by the CPU 301 when a user issues a command via an operation unit (not shown) to perform the pre-page reading process to detect dust. If the CPU 301 receives the command to perform the pre-page reading process to detect dust, the CPU 301 controls the document reading apparatus 19 such that light is emitted by the light exposure unit 13 at the location shown in FIG. 1 and reflected light is sensed by the CCD sensor unit 16 via the mirror unit 14.

First, in step S501, before the pre-page reading process is started, the CPU 301 sets a selector 306 via a register setting unit 314 such that an output from the selector 306 is supplied to the line buffer 307.

Next, in step S502, luminance values read by the reading device 305 are sequentially written on a pixel-by-pixel basis into the line buffer 307 via the selector 306.

In this process, background luminance values (of the pressure plate) are read by the reading device 305 for the 1st to 6th pixels, the 13th pixel and pixels following the 13th pixel as denoted by 401 in FIG. 4. The 7th to 12th pixels are at locations where there is dust, and thus luminance values not of the pressure plate (background) but of dust are read for these pixels. If the luminance values of pixels have been read for a whole one line, the process proceeds to step S503.

In step S503, the CPU 301 sets the dust-detected location determination unit 309 shown in FIG. 3 via the register setting unit 314 such that 0x30 is set as a dust judgment threshold value 201 (first setting). Next, in step S504, the CPU 301 sets the pixel luminance comparator 310 shown in FIG. 3 via the register setting unit 314 such that ±5 is set as a reading fluctuation range 202 with respect to the initial reading of luminance value (second setting).

Note that the dust judgment threshold value and the reading fluctuation range are determined to adapt to the characteristics of the reading device 305 or other factors, and they are not limited to specific values such as 0x30 or ±5. For example, a user may set the dust judgment threshold value and the reading fluctuation range via an operation unit (not shown) provided in the image reading apparatus. In a case where the image reading apparatus is connected to an external apparatus such as a PC (Personal Computer), a user may specify the dust judgment threshold value and the reading fluctuation range via an operation unit of the external apparatus such as a PC. In this case, the CPU 301 sets the dust judgment threshold value and the reading fluctuation range according to values specified by the user. Next, the page reading process performed by the dust processing unit 313 is described.

Figure 6:
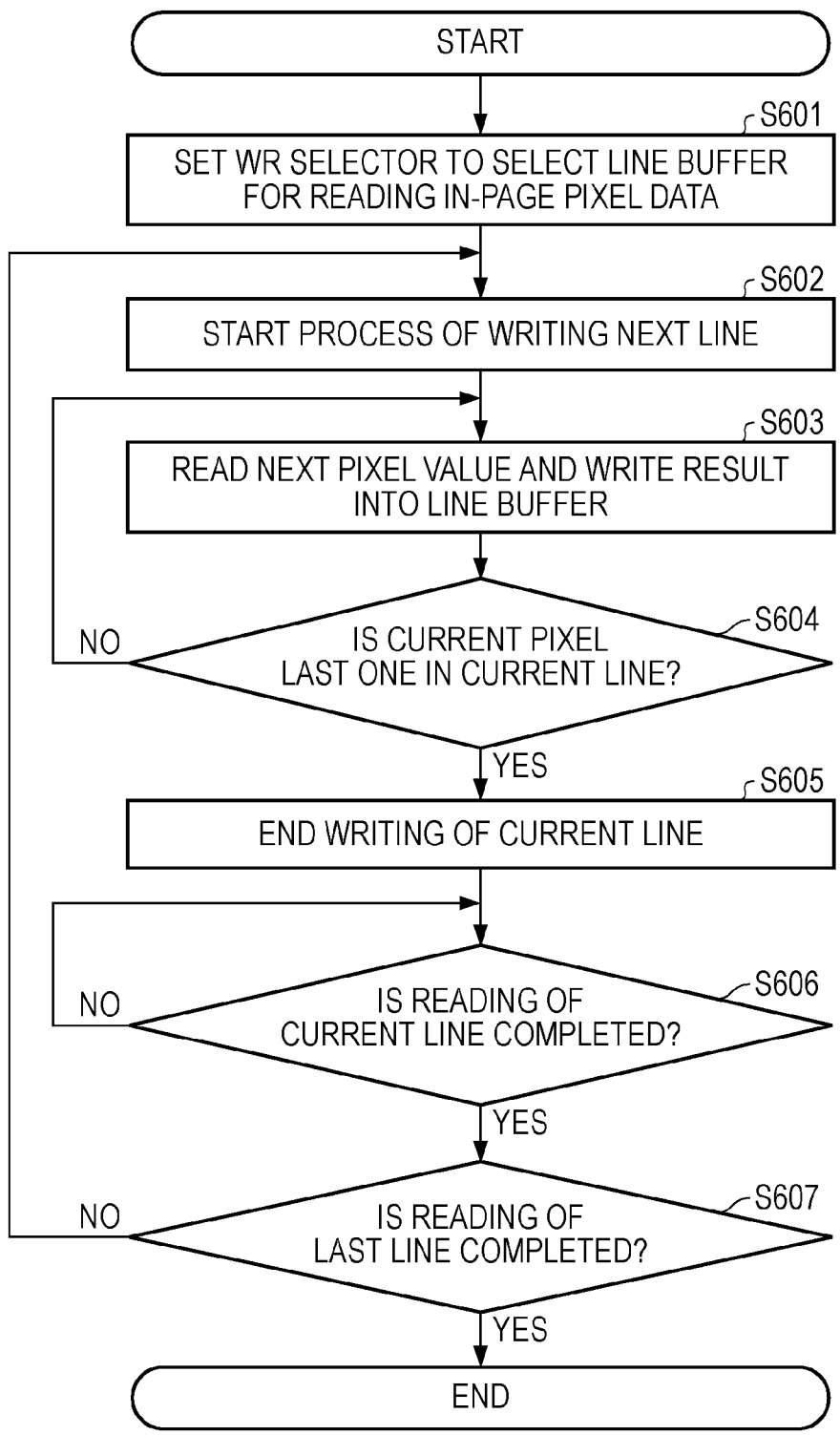
FIG. 6 is a flow chart illustrating a reading control procedure performed by an image reading apparatus.

FIG. 6 is a flow chart illustrating an example of a reading control procedure performed by the image reading apparatus according to the present embodiment of the invention. In the example shown in FIG. 6, writing into the in-page line buffer in the dust processing unit 313 shown in FIG. 3 is performed. This process includes steps S601 to S607 and is performed by the CPU 301 by loading a control program from the ROM 302 into the memory 303 and executing it with the dust processing unit 313. The process shown in the flow chart of FIG. 6 is started by the CPU 301 when a user issues a command via an operation unit (not shown) to perform the document reading process. If the CPU 301 receives the command to perform the document reading process, the CPU 301 starts the reading process including feeding documents on a one-by-one basis from a stack of documents set on the ADF and reading an image of the fed document using the CCD sensor unit 16.

First, in step S601, the CPU 301 sets the selector 306 via the register setting unit 314 such that the output from the selector 306 is supplied to the in-page line buffer 308. Then, in step S602, reading is started for a next line (the first line in this specific case).

Next in step S603, a pixel (the first pixel in this specific case) is read by the reading device 305 and a resultant pixel value is written into the in-page line buffer 308 via the selector 306. Next, in step S604, a determination is made as to whether the pixel being currently read is a last pixel in the current line. The determination as to whether the pixel is the last one is made by comparing a count value indicating the pixel position with a value stored in advance in the ROM 302 indicating the number of pixels in the main scanning direction of the reading device 305.

In a case where the CPU 302 determines that the current pixel is not the last one, the process returns to step S603 to perform the reading process for a next pixel.

On the other hand, in a case where the determination in step in S604 is that the pixel being currently read is the last pixel, the process proceeds to step S605. In step S605, the writing of the present line is ended.

Figure 7:
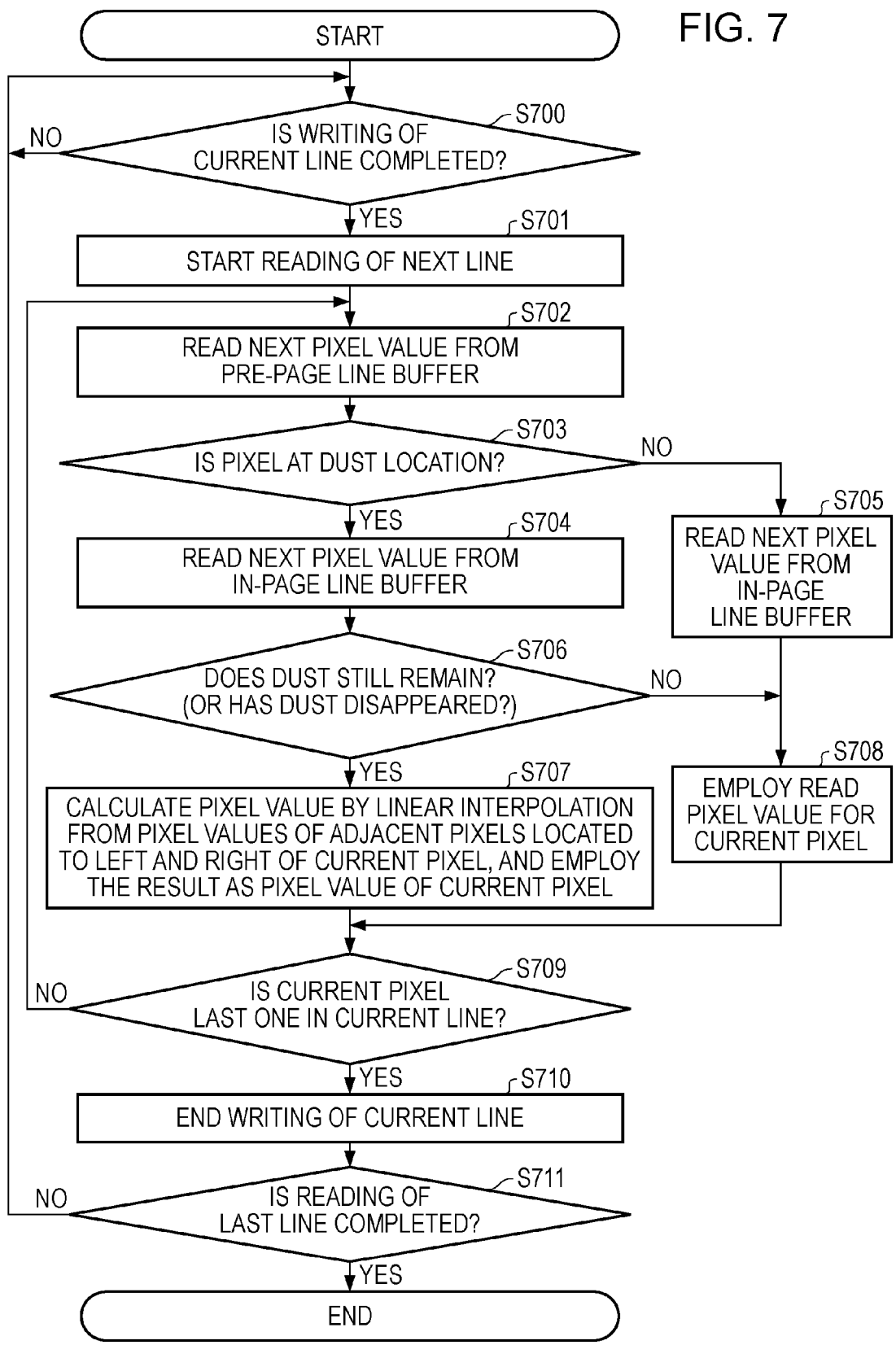
FIG. 7 is a flow chart illustrating a reading control procedure performed by an image reading apparatus.

Next, in step S606, the CPU 301 waits until pixel values written in the line buffer 308 have been completely read out in the reading process. More specifically, the CPU 301 waits until a process shown in FIG. 7 is completed that includes reading pixel data from the line buffer 308 and supplying the read pixel data to the pixel luminance comparator 310 and the corrected pixel value generator 311. More specifically, when the process in FIG. 7 reaches step S710, the CPU 301 determines that the process is completed that includes reading pixel data from the line buffer 308 and supplying the read pixel data to the pixel luminance comparator 310 and the corrected pixel value generator 311.

Next, in step S607, the CPU 301 determines whether the current line being read is a last line. In a case where it is determined that the line is not the last one, the process returns to step S602 to start the process for a next line. The determination as to whether the current line is the last one is performed as follows. The number of lines of the document being conveyed corresponds to the length of the document as measured in the direction in which document is conveyed, and thus the number of lines is determined from a document size and the determination is made, based on the number of lines, as to whether the reading is completed for the last line.

In a case where the CPU 301 determines that the current line is the last line, the process of writing into the in-page line buffer 308 is ended.

FIG. 7 is a flow chart illustrating an example of a reading control procedure performed by the image reading apparatus according to the present embodiment of the invention. In this example shown in FIG. 7, the luminance values of the pixels are corrected while making a determination as to whether the pixel value read from the in-page line buffer in the dust processing unit 313 shown in FIG. 3 is influenced by presence of dust. This process includes steps S700 to S711 and is performed by the CPU 301 by loading a control program from the ROM 302 into the memory 303 and executing it with the dust processing unit 313. The process of reading from the line buffer in the in-page reading process is described in detail below.

First, the process waits in step S700 until the process in step S605 in FIG. 6 to write pixel image data into the line buffer 308 is completed for one line. In a case where the CPU 301 determines in step S605 that the writing is completed for the present line, the process proceeds to step S701 to start the reading process for the first line.

In step S702, under the control of the CPU 301, the dust-detected location determination unit 309 reads the initial luminance value of the first pixel from the pre-page line buffer 307. In step S703, a determination is made as to whether the current pixel is at a dust-detected pixel location. That is, the dust-detected location determination unit 309 determines whether the luminance value read from the dust-detected location determination unit 309 is equal to or lower than the dust judgment threshold value that was set to be 0x30 in step S503 in FIG. 5. In a case where the dust-detected location determination unit 309 determines that the luminance value is equal to or lower than 0x30 set as the dust judgment threshold value, it is determined in step S703 that the current pixel is at a dust-detected location. In this case, dust-detected pixel location information is sent to the pixel luminance comparator 310, and the process proceeds to step S704.

On the other hand, in a case where the determination in step S703 by the dust-detected location determination unit 309 is that the pixel is not at a dust-detected location, the process proceeds to step S705.

In step S704, the dust-detected location determination unit 309 reads pixel luminance data of a next pixel from the in-page line buffer 308. In step S706, the pixel luminance comparator 310 determines whether the luminance value of the pixel read in step S704 is within the range of ±5 set as the reading fluctuation range 202 with respect to the initial readings of luminance value read in step S702. In a case where the determination by the pixel luminance comparator 310 is that the luminance value is within the reading fluctuation range 202, i.e., within ±5, it is determined that dust still remains at the pixel location.

On the other hand, in a case where the determination in step S706 by the pixel luminance comparator 310 is that the luminance value is out of the reading fluctuation range 202, i.e., out of the range of ±5, it is determined that the dust has disappeared, i.e., the dust no longer remains at the present pixel location. That is, when the pixel luminance comparator 310 determines that a change greater than the predetermined value has occurred in the luminance value, it is determined that the dust has disappeared, i.e., the dust no longer remains at the present pixel location.

Information indicating whether the dust still remains or the dust has disappeared is supplied from the pixel luminance comparator 31 to the corrected pixel value generator 311. In a case where the determination in step S706 by the pixel luminance comparator 310 is that the dust still remains, the process proceeds to step S707, but otherwise the process proceeds to step S708.

In a case where the determination in step S703 by the dust-detected location determination unit 309 is that the current pixel is not at a dust-detected pixel location, the process proceeds to step S705. In step S705, the pixel luminance comparator 310 reads pixel luminance data of a next pixel from the in-page line buffer 308. The process then proceeds to step S708.

In step S707, the corrected pixel value generator 311 calculates the luminance value for the pixel of interest at the dust-detected location by linear interpolation from luminance values of pixels located adjacent to the left/right of the pixel of interest, and the corrected pixel value generator 311 outputs the result as the luminance value for the current pixel. Thus, the luminance value of the pixel determined to be located at the dust-detected location is corrected so as to delete the effect of dust.

On the other hand, in the case where the process proceeded to step S708, the corrected pixel value generator 311 directly outputs the read value as the luminance value for the current pixel. As described above, the pixel luminance value for the current pixel output in step S707 or S708 is output as the luminance value shown in FIG. 3 to the DMAC 312 and is stored as read image data in the memory 303 via the bus 304.

Next, in step S709, the pixel luminance comparator 310 determines whether the current pixel is located at the right-hand end of the current line, i.e., whether the current pixel is the last pixel in the current line. If it is determined that the current pixel is the last pixel in the current line, the process proceeds to step S710. On the other hand, in a case where the determination in step S709 is that the current pixel is not the last pixel in the current line, the process proceeds to step S702 to perform the process on a next pixel.

In step S710, the pixel luminance comparator 310 determines that the reading for the present line is ended. In response, the CPU 301 determines that the reading is ended, and thus the CPU 301 makes an affirmative determination in step S606 in FIG. 6. Next, in step S711, the CPU 301 determines whether the current line is the last line. In a case where the determination in step S711 by the CPU 301 is that the current line is not the last line, the process returns to step S700 to perform the process for a next line. On the other hand, in a case where the determination in step S711 by the CPU 301 is that the current line not the last line, the process of reading from the in-page line buffer is ended. Thus, image data is produced and stored in the memory 303.

As described above, the luminance value of each pixel in each line output from the reading device 305 and written in the line buffer 308 is checked whether a change in luminance value has occurred, and the determination is made as to whether dust still remains at the pixel or the dust at the pixel has disappeared, based on whether the change in luminance value has occurred. That is, it is possible to determine whether dust on the document glass plate still remains there or the dust has been removed by motion of a sheet of a document.

Thus, it is possible to dynamically switch the process performed on pixels written in the line buffer 308 on a pixel-by-pixel basis such that the luminance value is corrected for some pixels, but for the other pixels, the luminance value written in the buffer line 308 is directly output without performing the correction.

Thus, in a case where dust is removed by a moving document in a document reading process, a correct luminance value read at a location at which there was dust but there is no longer dust is employed for a pixel at this location without employing a corrected luminance value.

In the above embodiments, the process described above with reference to FIG. 5 is performed by the image reading apparatus regardless of the document read command. Alternatively, the process described above with reference to FIG. 5 may be performed by the image reading apparatus in response to the document read command, and thereafter the processes described above with reference to FIGS. 6 and 7 may be performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-173954, filed Jul. 27, 2009, which is hereby incorporated by reference herein in its entirety.

What is claimed is:

1. An image reading apparatus comprising:
   a conveying unit configured to convey a document;
   a reading unit configured to read an image of the document conveyed by the conveying unit;
   a judging unit configured to judge whether a foreign substance exists; and
   a correcting unit configured to start, in a case where the judging unit judges that the foreign substance exists after the reading unit starts reading of the image of the document conveyed by the conveying unit, correction of a pixel of image data at a position of an abnormal pixel which is due to the foreign substance and then stop the correction in a case where the judging unit judges that the foreign substance does not exist after the correcting unit starts the correction and before the reading unit completes the reading of the image of the document conveyed by the conveying unit.

2. An image reading apparatus according to claim 1, wherein the judging unit compares a luminance value read at the position of the abnormal pixel with an initial value read before the reading unit starts the reading of the image of the document conveyed by the conveying unit, and if a change equal to or greater than a predetermined value is detected in the luminance value with respect to the initial value, then the judging unit judges that the foreign substance does not exist.

3. An image reading apparatus according to claim 2, further comprising a receiving unit configured to receive, from a user, the predetermined value.

4. An image reading apparatus according to claim 1, wherein the correcting unit corrects the abnormal pixel by interpolation the abnormal pixel based on adjacent pixels.

5. A control method for controlling an image reading apparatus comprising:
   conveying a document;
   reading an image of the conveyed document;
   judging whether a foreign substance exists; and
   starting, in a case where it is judged that the foreign substance exists after the reading of the image of the conveyed document is started, correction of a pixel of image data at a position of an abnormal pixel which is due to the foreign substance and then stopping the correction performed in a case where it is judged that the foreign substance does not exist after the correction is started and before the reading of the image of the conveyed document is completed.

6. A non-transitory computer readable recording medium for storing a computer program for controlling an image reading apparatus, the computer program comprising:
   a code to convey a document;
   a code to read an image of the conveyed document;
   a code to judge whether a foreign substance exists; and
   a code to start, in a case where it is judged that the foreign substance exists after the reading of the image of the conveyed document is started, correction of a pixel of image data at a position of an abnormal pixel which is due to the foreign substance, and then stop the correction in a case where it is judged that the foreign substance does not exist after the correction is started and before completing the reading of the image of the conveyed document.

* * * * *